(12) United States Patent
Ho et al.

(10) Patent No.: US 11,612,529 B2
(45) Date of Patent: Mar. 28, 2023

(54) COLLAPSIBLE MOBILITY SCOOTER (71) Applicant: HEARTWAY MEDICAL PRODUCTS CO., LTD., Taichung (TW)

(72) Inventors: Cheng-Yu Ho, Taichung (TW); Yung-Ho Ho, Taichung (TW)

(73) Assignee: HEARTWAY MEDICAL PRODUCTS CO., LTD., Taichung (TW)

( * ) Notice: Subject to any disclaimer, the term of this patent is extended or adjusted under 35 U.S.C. 154(b) by 392 days.

(21) Appl. No.: 16/941,524

(22) Filed: Jul. 28, 2020

(65) Prior Publication Data

US 2021/0038450 A1 Feb. 11, 2021

(30) Foreign Application Priority Data

Aug. 7, 2019 (TW) ................................. 108210419

(51) Int. Cl.
*A61G 5/08* (2006.01)
(52) U.S. Cl.
CPC .................................. *A61G 5/0833* (2016.11)
(58) Field of Classification Search
CPC .......... A61G 5/0833; A61G 5/08; B62J 1/08; B62K 15/008; B62K 15/006; B62K 2015/005; B62K 5/007; B62K 5/003
See application file for complete search history.

(56) References Cited

U.S. PATENT DOCUMENTS

| 7,125,080 B1* | 10/2006 | Jarema, III | A61G 5/125 297/411.3 |
| 9,440,698 B2* | 9/2016 | Dadoosh | B60L 53/14 |
| 10,730,579 B2* | 8/2020 | Chang | B62K 5/01 |
| 2003/0141121 A1* | 7/2003 | Flowers | A61G 5/08 180/65.1 |
| 2016/0089285 A1* | 3/2016 | Cheng | B62K 5/007 180/58 |

FOREIGN PATENT DOCUMENTS

| CN | 107366478 B | * | 7/2022 | ............. E05B 15/00 |
| EP | 3656651 A1 | * | 5/2020 | ............... B62J 1/08 |
| TW | M542599 U | * | 6/2017 | |

* cited by examiner

*Primary Examiner* — Steve Clemmons
(74) *Attorney, Agent, or Firm* — Bruce Stone LLP; Joseph A. Bruce (57) ABSTRACT

A collapsible mobility scooter includes a chassis and a transformation actuator. The chassis includes a rear frame a front frame pivotally connected to a rear frame. The front frame is pivoted to the rear frame when the chassis is in a collapsed position. The front frame is pivoted away from the rear frame when the chassis is in an extended position. The transformation actuator includes a rear end connected to the rear frame and a front end connected to the front frame.

13 Claims, 9 Drawing Sheets

COLLAPSIBLE MOBILITY SCOOTER

BACKGROUND OF INVENTION

1. Field of Invention

The present invention relates to a mobility scooter and, more particularly, to a collapsible mobility scooter.

2. Related Prior Art

A mobility scooter is an electric scooter used by a disabled person for transportation. Some mobility scooters are not collapsible and hence occupy large space even in storage or transportation.

Some other mobility scooters are collapsible and hence occupy smaller pace. A conventional collapsible mobility scooter includes a chassis for supporting a steering rod and a chair. The chassis is not collapsible. The steering rod includes a lower section pivotally connected to an upper section. The lower section of the steering rod is connected to the chassis. The upper section of the steering rod is connected to a handle. An elevating device is arranged between the chair and the chassis. The elevating device includes a pair of cross-linked bars like a pair of scissors. In an extended position of the mobility scooter, the upper section of the steering rod is pivoted away from the chair and the pair of cross-linked bars is opened to lower the chair on the chassis. In a collapsed position of the mobility scooter, the upper section is pivoted toward the chair and the pair of cross-linked bars is closed to lift the chair on the chassis. However, the collapsible mobility scooter still occupies large space since the chassis is not collapsible.

The present invention is therefore intended to obviate or at least alleviate the problems encountered in the prior art.

SUMMARY OF INVENTION

It is the primary objective of the present invention to provide a collapsible mobility scooter that occupies relatively small space in a collapsed position.

To achieve the foregoing objective, the collapsible mobility scooter includes a chassis and a transformation actuator. The chassis includes a front frame pivotally connected to a rear frame. The front frame is pivoted to the rear frame when the chassis is in a collapsed position. The front frame is pivoted away from the rear frame when the chassis is in an extended position. The transformation actuator includes a rear end connected to the rear frame and a front end connected to the front frame.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
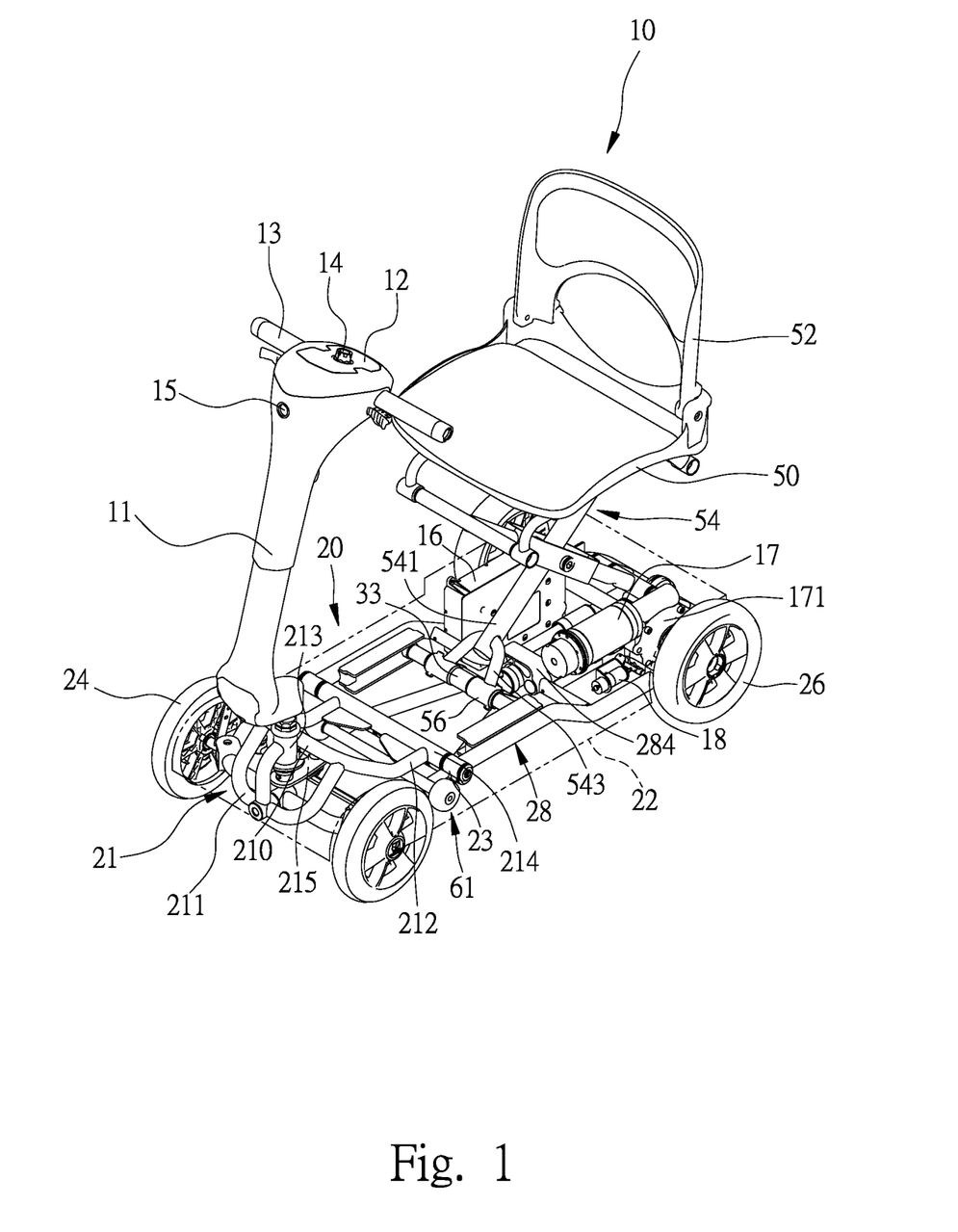
FIG. 1 is a perspective view of a mobility scooter according to the preferred embodiment of the present invention.
Figure 8:
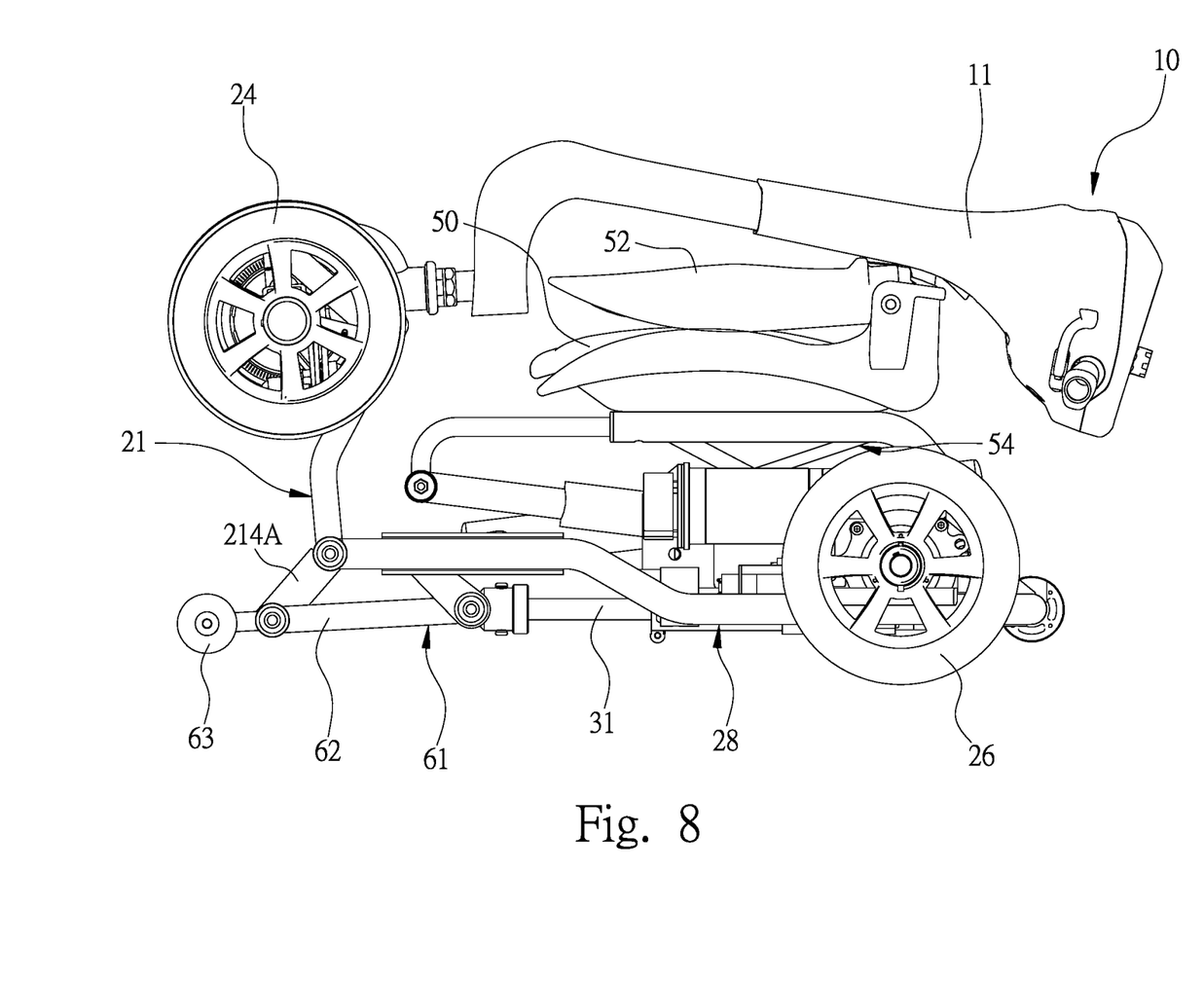
FIG. 8 is a side view of the mobility scooter in a collapsed position other than an extended position shown in FIG. 3.

Referring to FIG. 1, a mobility scooter 10 includes a chassis 20 and a chair 50 according to the preferred embodiment of the present invention. The mobility scooter 10 is movable between an extended position for operation (FIG. 3) and a collapsed position for storage or transportation (FIG. 8). The mobility scooter 10 occupies less space in the collapsed position than in the extended position.

The chassis 20 is movable between an extended position and a collapsed position. The chair 50 is movable between a lifted position and a lowered position. The chassis 20 is in the extended position and the chair 50 is in the lifted position when the mobility scooter 10 is in the extended position. The chassis 20 is in the collapsed position and the chair 50 is in the lowered position when the mobility scooter 10 is in the collapsed position.

Referring to FIGS. 1 through 4, the chassis 20 includes a front frame 21 pivotally connected to a rear frame 28 by a hinge. The front frame 21 includes a transverse tube 210 formed between two longitudinal tubes 212. The rear frame 28 includes a transverse tube 281 formed between two longitudinal tubes 282. The hinge includes a sleeve 214, two collars 23 and a first pivot (not numbered). The sleeve 214 is connected to the longitudinal tubes 212 of the front frame 21. The collars 23 are respectively connected to the longitudinal tubes 282 of the rear frame 28. The first pivot is inserted in the sleeve 214 and the collars 23.

The chair 50 is formed with a backrest 52. The chair 50 is connected to the rear frame 28 by an elevating device. Preferably, the elevating device includes two cross-linked units 54. The elevating device can include only one cross-linked unit 54 in another embodiment.

Each of the cross-linked units 54 includes two rods 541 and 542, two extensions 543 and two collars 56. A middle portion of the rod 541 is pivotally connected to a middle portion of the rod 542. The rod 542 includes an upper end pivotally connected to the chair 50 and a lower end pivotally connected to the transverse tube 281 by a bearing 544. The rod 541 includes an upper end movably connected to the chair 50. Each of the extensions 543 extends from a side of the rod 541. Each of the collars 56 is connected to one of the extensions 543.

The cross-linked units 54 are movable between an extended position and a collapsed position. The chair 50 is in the lifted position as the cross-linked units 54 are in the extended position. The chair 50 is in the lowered position as the cross-linked units 54 are in the collapsed position. To move each of the cross-linked units 54 to the extended position, the lower end of the rod 541 is moved toward the lower end of the rod 542. To move each of the cross-linked units 54 to the collapsed position, the lower end of the rod 541 is moved away from the lower end of the rod 542._

Preferably, the mobility scooter 10 includes a rolling device 61 to facilitate movement of the mobility scooter 10 in the collapsed position. The rolling device 61 includes two collars 65, two beams 62, two collars 64, two rods 66, a sleeve 68, an auxiliary axle (not numbered) and two auxiliary wheels 63. Each of the beams 62 includes a rear end connected to one of the collars 65 and a front end connected to one of the collars 64. Each of the rods 66 includes a rear end connected to one of the collars 64 and a front end connected to the sleeve 68. The auxiliary axle includes a middle section inserted in the sleeve 68 and two ends located out of the sleeve 68. Each of the auxiliary wheels 63 is connected to one of the ends of the auxiliary axle.

The rolling device 61 (the auxiliary wheels 63 in particular) is switchable between a rear position (FIG. 3) and a front position (FIG. 8). As the mobility scooter 10 is in the extended position, the rolling device 61 is in the rear position so that the auxiliary wheels 63 are covered by the front frame 21. When the mobility scooter 10 is in the withdrawn position, the rolling device 61 is in the front position so that the auxiliary wheels 63 are located in front of the front frame 21. Now, the auxiliary wheels 63 are allowed to roll on a floor 60 when the rear frame 28 is lifted.

Preferably, the mobility scooter 10 includes a transformation actuator. The transformation actuator is operable to move the chassis 20 between the extended and collapsed positions, move the chair 50 between the lifted and lowered positions, and move the rolling device 61 between the rear and front positions.

Figure 9:
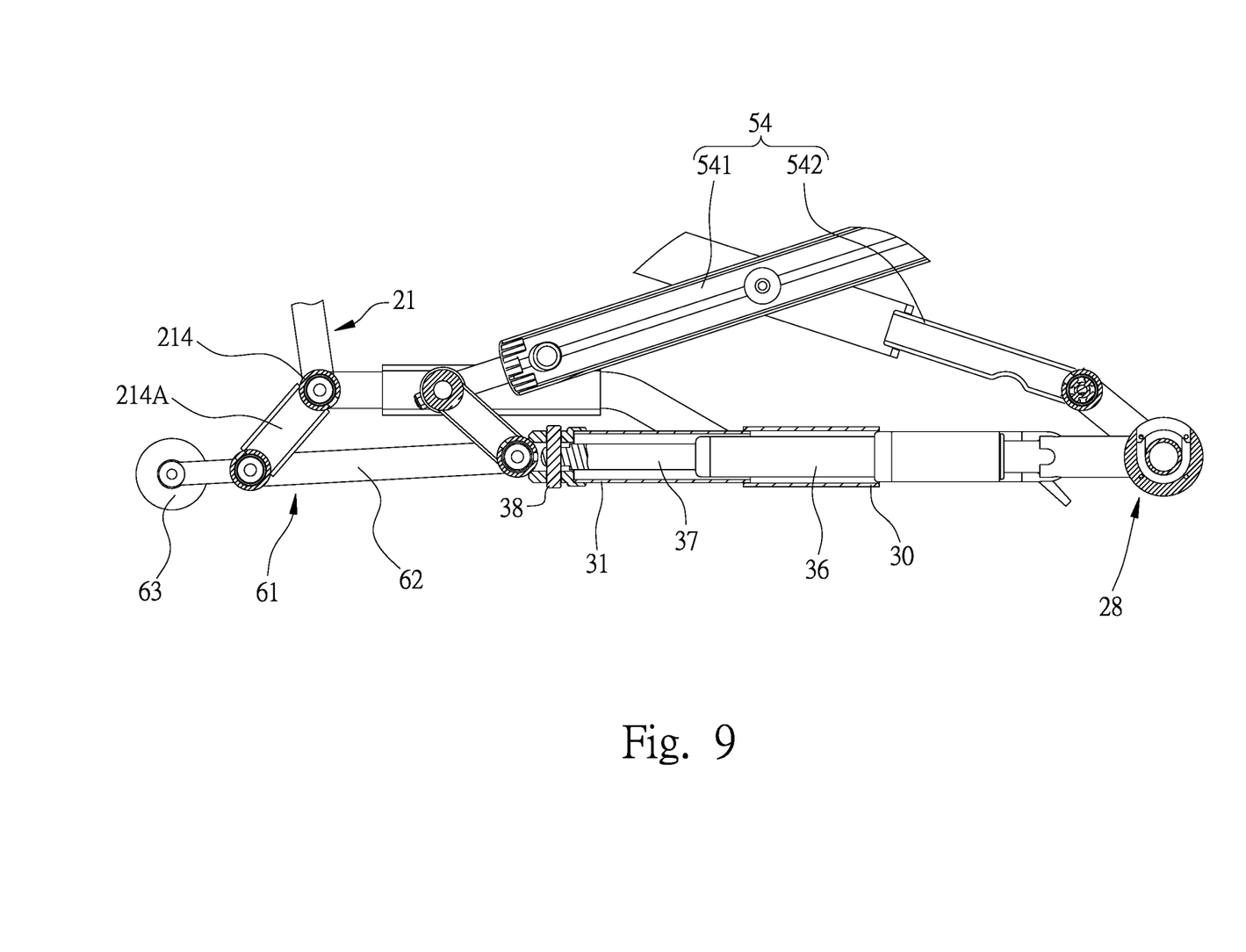
FIG. 9 is an enlarged partial view of the mobility scooter depicted in FIG. 8.

The transformation actuator includes two sleeves 32 and 33, a rod 34, a sliding axle 35, a cylinder 36 and a piston rod 37 (FIG. 9). Preferably, the cylinder 36 is a pneumatic cylinder. The cylinder 36 can be a hydraulic cylinder in another embodiment. The cylinder 36 includes a rear end connected to the transverse tube 281 of the rear frame 28 by a support device. The piston rod 37 includes a rear end movably inserted in the cylinder 36 and a front end connected to the sleeve 32 (FIG. 2) by a pin 38 (FIG. 9). The rod 34 includes a rear end connected to the sleeve 32 and a front end connected to the sleeve 33.

The sliding axle 35 includes a middle section inserted in the sleeve 33 and two ends respectively movable along two tracks 283 that are connected to the front sections 282A of the longitudinal tubes 282 respectively. Preferably, a caster (not numbered) is connected to each of the ends of the sliding axle 35. Preferably, each of the tracks 283 includes a groove (not numbered) to receive one of the casters. The sliding axle 35 is smoothly movable due to the use of the tracks 283.

Figure 4:
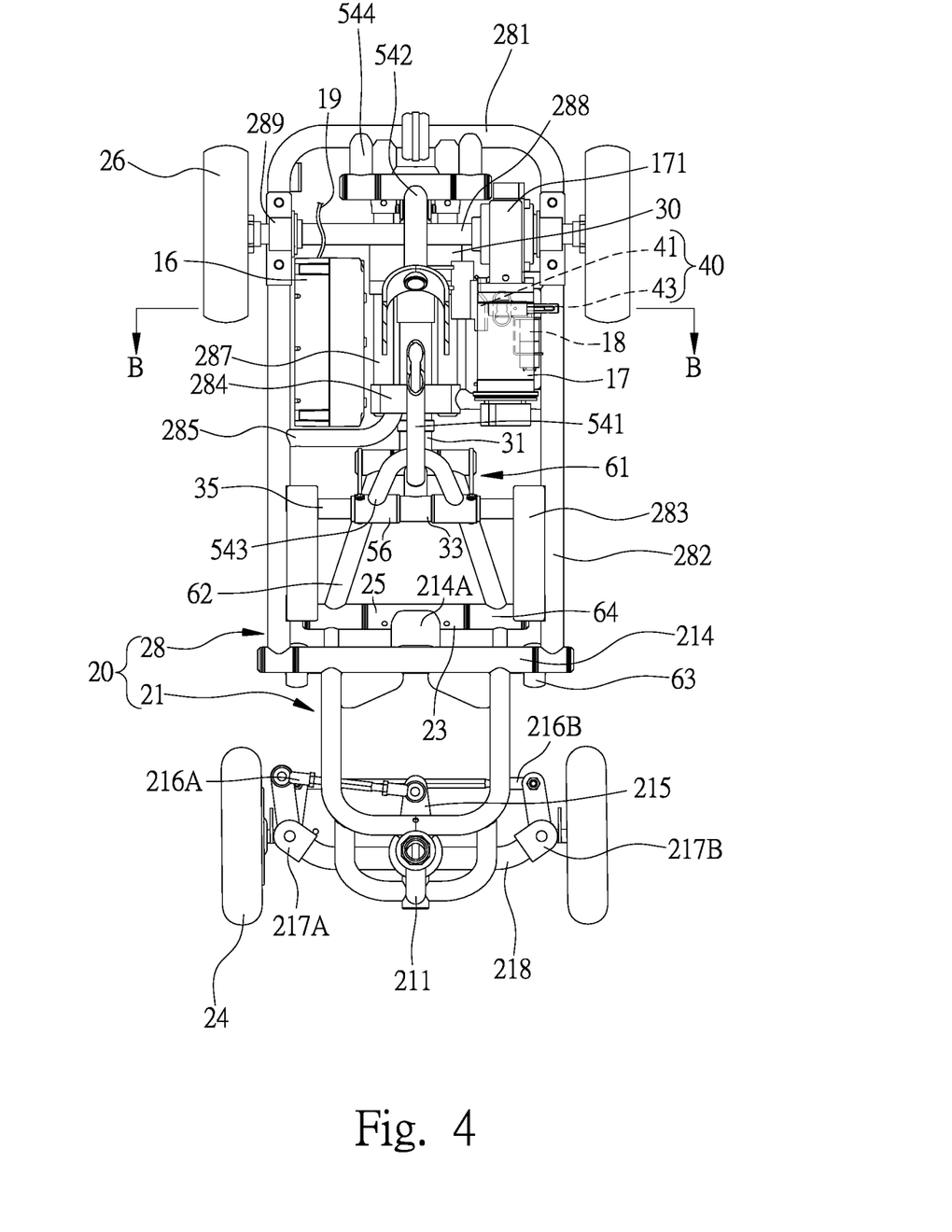
FIG. 4 is a cross-sectional view of the mobility scooter taken along a line A-A shown in FIG. 3.

The cross-linked units 54 are connected to the transformation actuator. To this end, the collars 56 are rotationally supported on the sliding axle 35, with the sleeve 33 located between the collars 56 (FIG. 4). The transformation actuator is connected to the cross-linked units 54 since the sleeve 33 and the collars 56 are supported on the sliding axle 35.

The rolling device 61 is connected to the transformation actuator. To this end, the collars 65 are rotationally supported on a second pivot (not numbered) that supports the sleeve 32 to pivotally connect the rolling device 61 to the transformation actuator.

The front frame 21 is connected to the transformation actuator via the rolling device 61. To this end, the font frame 21 includes a crank 214A and a sleeve 25. The sleeve 25 extends parallel to the sleeve 214. The crank 214A includes an end connected to the sleeve 25 and another end connected to the sleeve 214. A third pivot (not numbered) is inserted in the sleeve 25 and the collars 64 to pivotally connect the front frame 21 to the rolling device 61. The front frame 21 is connected to the transformation actuator because the rolling device 61 is connected to the transformation actuator as mentioned above.

Figure 5:
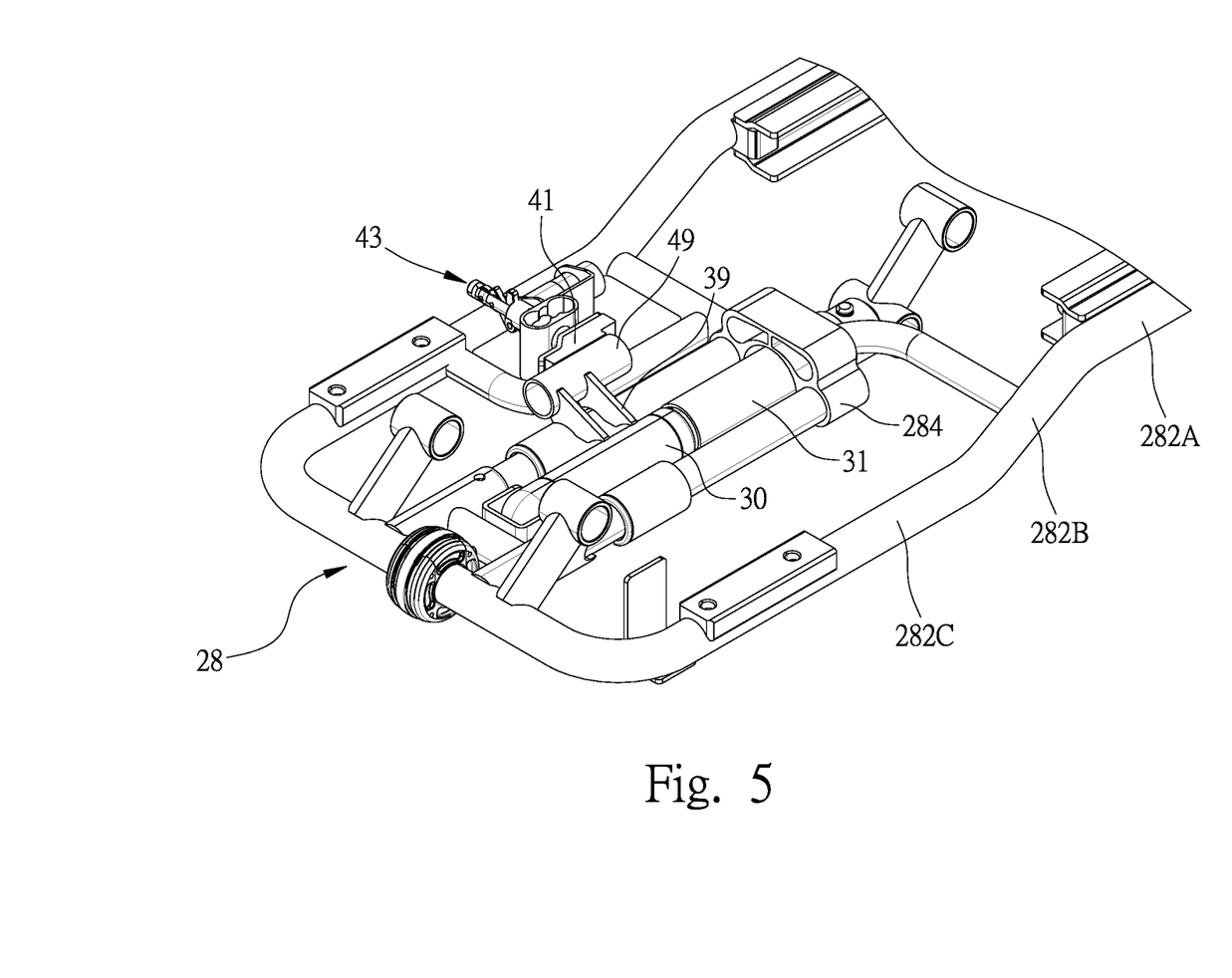
FIG. 5 is a perspective view of a safety device and a portion of a rear frame of a chassis of the mobility scooter shown in FIG. 1.
Figure 6:
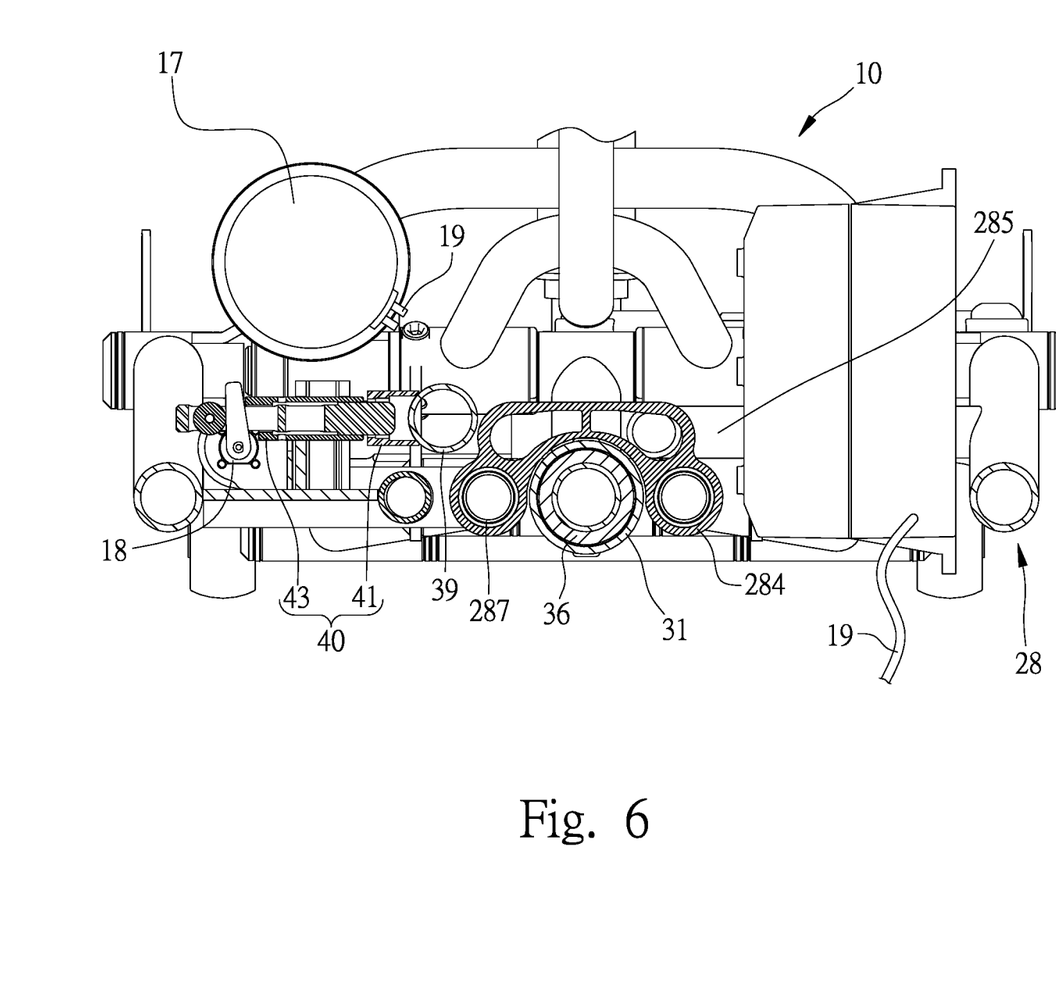
FIG. 6 is a cross-sectional view of the mobility scooter taken along a line B-B shown in FIG. 4.
Figure 7:
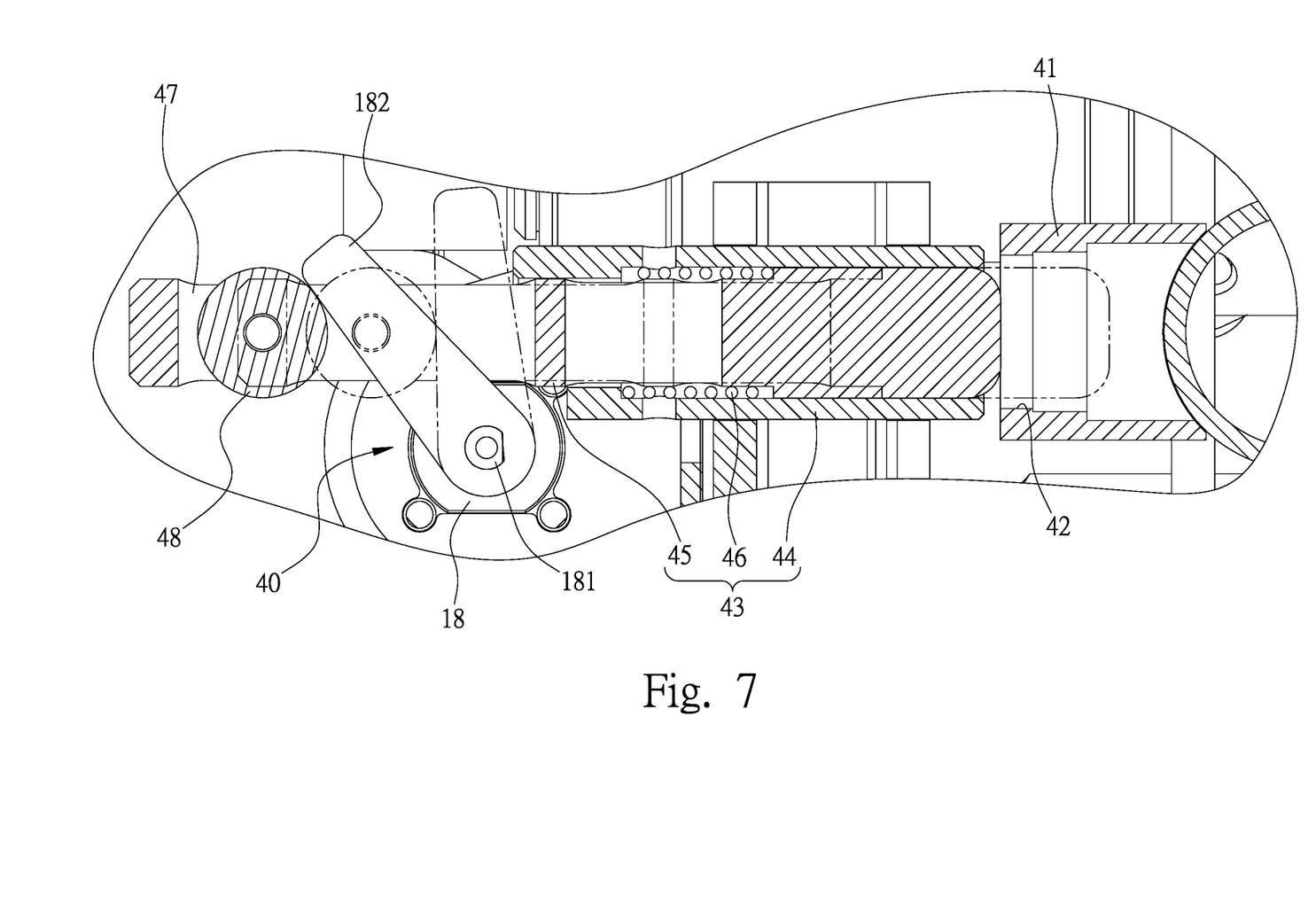
FIG. 7 is an enlarged partial view of the mobility scooter depicted in FIG. 6.

Referring to FIGS. 5 to 7, the mobility scooter 10 preferably includes a safety device 40 for keeping the mobility scooter 10 in the extended position. In specific, the safety device 40 is used to lock the transformation actuator, thereby locking the rolling device 61, the front frame 21 and the cross-linked units 54.

To this end, the transformation actuator includes two sheaths 30 and 31, a connector 39 and a tube 49. The sheath 31 includes a front end connected to the front end of the piston rod 37 by welding so that the sheath 31 is movable with the piston rod 37. The sheath 30 includes a front end connected to a rear end of the sheath 31 by welding so that the sheath 30 is movable with the sheath 31. Preferably, the sheath 30 is made independent of the sheath 31 before they are connected to each other. The sheaths 30 and 31 can be made in one piece in another embodiment. The connector 39 includes an end connected to the sheath 30 and another end connected to the tube 49 by welding.

The safety device 40 includes a socket 41 and a lock 43. The socket 41 is connected to the tube 49. The lock 43 includes a casing 44, a tongue 45 and a spring 46. The casing 44 is connected to the rear frame 28 by welding so that the casing 44 is not movable relative to the rear frame 28. The casing 44 receives the tongue 45 and the spring 46. The spring 46 is compressed between a shoulder formed on the tongue 45 and a shoulder formed on an internal face of the casing 44. The spring 46 tends to insert a leading end of the tongue 45 into a bore 42 of the socket 41. That is, the spring 46 tends to move the tongue 45 into a locking position.

A minor motor 18 is used to move the tongue 45 into an unlocking position, i.e., move the leading end of the tongue 45 from the socket 41. To this end, a lever 182 is connected to a mandrel 181 of the minor motor 18, and the tongue 45 includes a roller 48 inserted in a slot 47 near a tailing end of the tongue 45. The lever 182 is inserted in the slot 47 and abutted against the roller 48.

The minor motor 18 is actuated to pivot the lever 182 to push the roller 48 to move the leading end of the tongue 45 from the socket 41. When turned off, the minor motor 18 stops pivoting the lever 182 to allow the spring 46 to insert the leading end of the tongue 45 into the socket 41.

Preferably, the front frame 21 includes a shell 22 to cover the front frame 21 and the rear frame 28 and support a rider's feet without interfering with pivoting of the front frame 21 relative to the rear frame 28. The shell 22 includes multiple sheets.

Two front wheels 24 are connected to the front frame 21. Two rear wheels 26 are connected to the rear frame 28. Rolling or steering of the front wheels 24 and rolling of the rear wheels 26 are not hindered by the shell 22.

Preferably, the chassis 20 includes a multi-branch element 211 and a head tube 213. The longitudinal tubes 212 are connected to the sleeve 214 by welding. The multi-branch element 211 includes a middle branch and two lateral branches. The lateral branches of the multi-branch element 211 are connected to the transverse tube 210 by welding. A front portion of the head tube 213 is connected to the middle branch of the multi-branch element 211 by welding. A rear portion of the head tube 213 is connected to the transverse tube 210 by welding.

A shaft (not numbered) includes a section rotationally inserted in the head tube 213 by a bearing (not shown), with upper and lower ends of the shaft located out of the head tube 213. The upper end of the shaft is connected to a lower end of a steering rod 11. The lower end of the shaft is connected to a direction-controlling element 215.

A handle 13 is secured to an upper end of the steering rod 11. The handle 13 includes two end sections located on two opposite sides of the steering rod 11. The rider grips the ends sections of the handle 13 to steer the mobility scooter 10.

A control panel 12 is located on the upper end of the steering rod 11 and a middle section of the handle 13. The control panel 12 is electrically connected to a knob 14, a start button 15, a power supply 16, a main motor 17, the minor motor 18 and other electric and/or electronic elements via an electronic circuit and/or wires 19 (FIGS. 4 and 6).

The control panel 12 is preferably a touch panel operable to control the power supply 16 to provide a current to the main motor 17. The control panel 12 is operable to show patterns, bar codes, stripes and/or data to show mechanical condition and/or performance of the mobility scooter 10 such as the state of lights, the speed of the mobility scooter 10 and the mode of operation of the mobility scooter 10. The power supply 16 is preferably a rechargeable battery.

When the mobility scooter 10 is in the extended position, the knob 14 is operable to change the speed of the mobility scooter 10 via changing the amperage or voltage of the current sent to the main motor 17 from the power supply 16.

The start button 15 is operable to control the power supply 16 to provide a current to the minor motor 18 to switch the mobility scooter 10 between the extended and collapsed positions. The power supply 16 stops energizing the main motor 17 as the mobility scooter 10 is in the collapsed position.

Preferably, the knob 14 is located in a middle portion of the control panel 12, and the start button 15 is preferably located in front of the steering rod 11. However, the position of the knob 14 and the position of the start button 15 can be changed.

Figure 2:
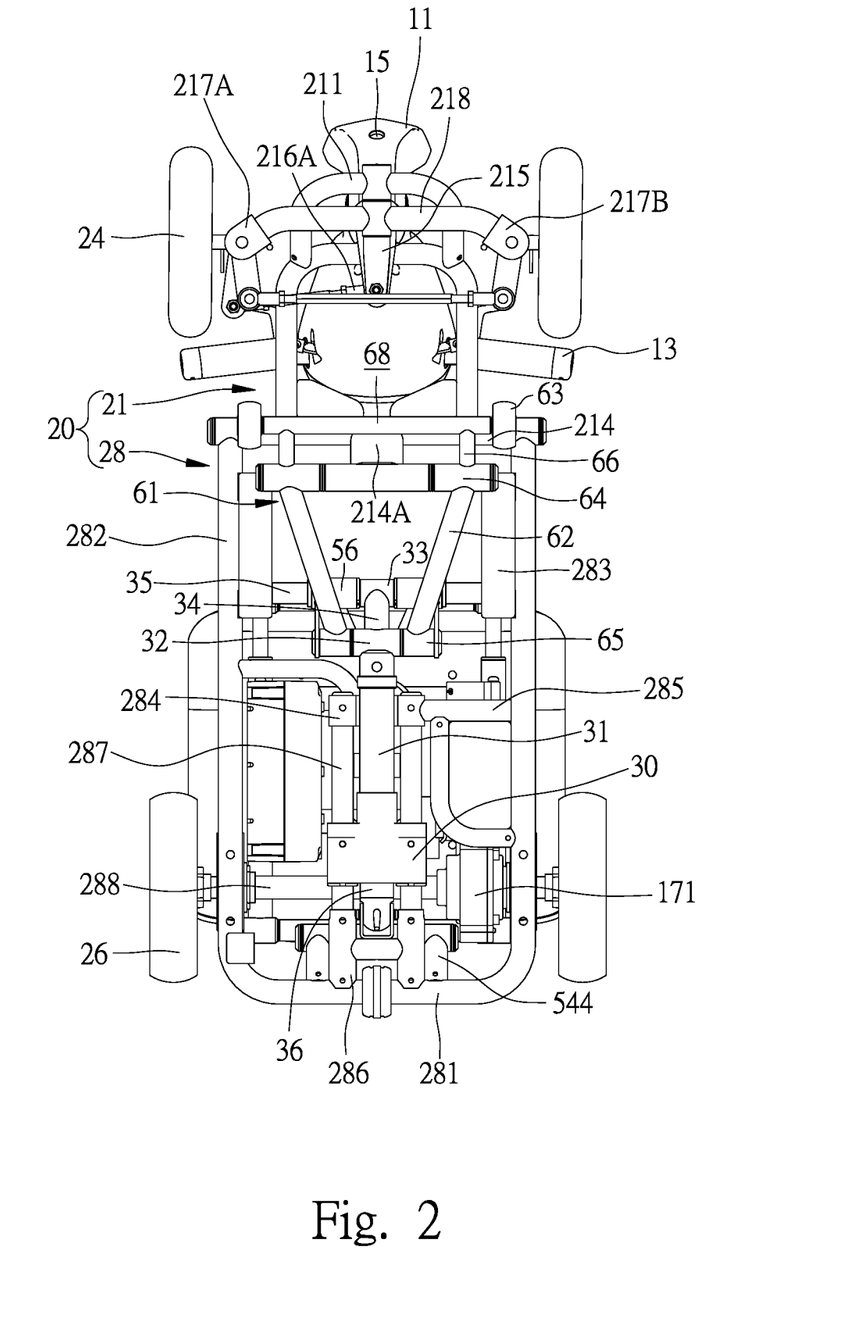
FIG. 2 is a bottom view of the mobility scooter shown in FIG. 1.
Figure 3:
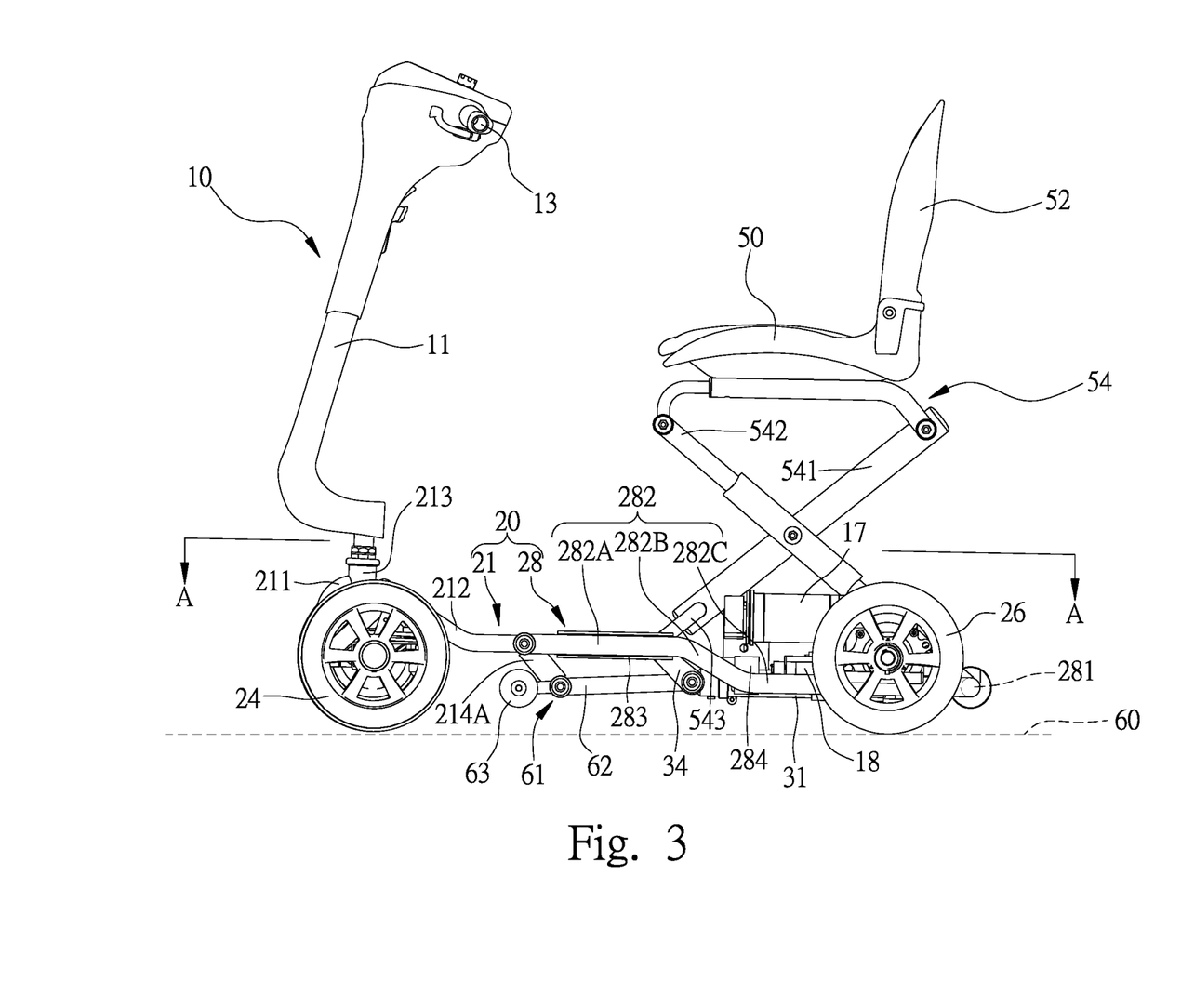
FIG. 3 is a side view of the mobility scooter shown in FIG. 1.

Referring to FIGS. 2 through 4, the front frame 21 includes a balance rod 218, two connecting rods 216A and 216B and two yokes 217A and 217B. The connecting rod 216A extends shorter than the connecting rod 216B.

Each of the yokes 217A and 217B is pivotally connected to one of two ends of the balance rod 218. Each of the yokes 217A and 217B is connected to one of the front wheels 24. The balance rod 218 is located below the direction-controlling element 215. A middle portion of the balance rod 218 is pivotally connected to another section of the multi-branch element 211. Thus, the balance rod 218 pivots like a seesaw to reduce impacts on the front frame 21 of the chassis 20 when the front wheels 24 roll on a bump portion of a floor 60.

The long connecting rod 216B connects the yoke 217A to the yoke 217B. The short connecting rod 216A connects the yoke 217A to the direction-controlling element 215. Thus, the handle 13 is operable to steer the front wheels 24.

The rear frame 28 includes a U-shaped element including a transverse tube 281 formed between two longitudinal tubes 282. The longitudinal tubes 282 are identical to each other in shape. Each of the longitudinal tubes 282 is a bent element including an intermediate section 282B formed between a front section 282A and a rear section 282C. The front section 282A and the rear section 282C extend substantially parallel to the floor 60. The front section 282A is located further from the ground than the rear section 282C is. Thus, the intermediate section 282B extends in a slant manner.

The front section 282A of each of the longitudinal tubes 282 is connected to a portion of the sleeve 214 by welding. Thus, the front frame 21 is pivotally connected to the rear frame 28.

A bearing 289 is connected to the rear section 282C of each of the longitudinal tubes 282. The bearings 289 support an axle 288 that includes two ends respectively connected to the rear wheels 26. The axle 288 is operatively connected to a gear box 171 that is in turn operatively connected to the main motor 17. The gear box 171 is connected to a proper portion of the rear frame 28 to keep the main motor 17 in position.

Referring to FIGS. 2 and 6, the support device is used to connect the cylinder 36 to the rear frame 28. The support device includes a restraining element 284, two crossbars 285, a limiting element 286 and two longitudinal elements 287. Each of the crossbars 285 is connected to the intermediate section 282B of one of the longitudinal tubes 282. The restraining element 284 is an inverted U-shaped element formed with two lateral sections (FIG. 5). Each of the lateral sections of the restraining element 284 is connected to one of the crossbars 285. Each of the longitudinal bars 287 is connected to one of the lateral sections of the restraining element 284. The limiting element 286 includes two lateral sections. A front portion of each of the lateral sections of the limiting element 286 is connected to one of the longitudinal bars 287. A rear portion of each of the lateral sections of the limiting element 286 is connected to the transverse tube 281.

The control panel 12 is turned on when the mobility scooter 10 is turned on by a key for example. Now, the control panel 12 is operable to send a current to the main motor 17 from the power supply 16 to rotate the rear wheels 26 via the axle 288. Thus, the rear wheels 26 drive the mobility scooter 10 on the floor 60.

The control panel 12 is turned off when the mobility scooter 10 is turned off. Now, the start button 15 is operable to send a current to the minor motor 18 from the power supply 16 to switch the mobility scooter 10 between the extended and collapsed positions.

To move the mobility scooter 10 to the withdrawn position shown in FIGS. 8 and 9, the start button 15 is pushed. Now, the minor motor 18 pivots the lever 182 toward the roller 48 via the mandrel 181. Thus, the lever 182 pushes the roller 48 and hence moves the leading end of the tongue 45 from the socket 41, i.e., moves the safety device 40 to the unlocking position.

Now, the sheath 30 is allowed to move. Accordingly, the piston rod 37 is allowed to extend from the cylinder 36. Thus, the transformation actuator pushes the auxiliary wheels 63 to the front position, pivots the front frame 21 toward the rear frame 28, and moves the cross-linked units 54 to the collapsed position and hence moves the chair 50 to the lowered position. During the collapsing, the backrest 52 covers the chair 50 not interfere with the pivoting of the steering rod 11.

To move the mobility scooter 10 to the extended position shown in FIGS. 1 and 3, the start button 15 is pushed again to actuate the piston rod 37 to retreat into the cylinder 36. Thus, the transformation actuator moves the auxiliary wheels 63 to the rear position, pivots the front frame 21 away from the rear frame 28, and moves the cross-linked units 54 to the extended position and hence moves the chair 50 to the lifted position.

Then, the minor motor 18 pivots the lever 182 away from the roller 48 via the mandrel 181. Thus, the spring 46 pushes the tongue 45 toward the socket 41 and hence inserts the leading end of the tongue 45 into the socket 41, i.e., moves the safety device 40 to the locking position. Hence, the mobility scooter 10 is kept in the extended position.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A collapsible mobility scooter comprising:
    a chassis comprising a rear frame and a front frame pivotally connected to the rear frame, wherein the front frame is pivoted to the rear frame when the chassis is in a collapsed position, wherein the front frame is pivoted away from the rear frame when the chassis is in an extended position;
    a transformation actuator comprising:
        a cylinder comprising a rear end connected to the rear frame; and
        a piston rod comprising a rear end movably inserted in the cylinder and a front end connected to the front frame; and
    a safety device for locking the piston rod relative to the cylinder, wherein the safety device comprises:
        a socket connected to the piston rod;
        a lock comprising a tongue formed with a tailing end and a leading end movable into the socket; and
        a minor motor for moving the tongue by the tailing end to move the leading end of the tongue from the socket.

2. The collapsible mobility scooter according to claim 1, comprising a sheath comprising a front end connected to the front end of the piston rod, wherein the socket is connected to the sheath.

3. The collapsible mobility scooter according to claim 2, wherein the transformation actuator comprises a pin fitted in the piston rod and the sheath.

4. The collapsible mobility scooter according to claim 1, wherein the lock comprises a spring for biasing the tongue to insert the leading end of the tongue into the socket.

5. The collapsible mobility scooter according to claim 4, wherein the lock comprises a casing connected to the rear frame, wherein the tongue comprises a section movable in the casing, wherein the spring is inserted in the casing, wherein the spring is compressed between a portion of the tongue and an internal portion of the socket.

6. The collapsible mobility scooter according to claim 5, comprising a lever connected to the minor motor at an end and connected to the tongue at another end.

7. The collapsible mobility scooter according to claim 6, wherein the minor motor comprises a mandrel connected to the lever, wherein the tongue comprises a slot for receiving the lever.

8. The collapsible mobility scooter according to claim 7, wherein the safety device comprise a roller inserted in the slot and connected to the tongue, wherein the lever is operable to push the roller to move the tongue.

9. The collapsible mobility scooter according to claim 1, wherein the cylinder is selected from the group consisting of a pneumatic cylinder and a hydraulic cylinder.

10. The collapsible mobility scooter according to claim 1, comprising a rolling device arranged between the piston rod and the front frame so that the rolling device is movable between a front position and a rear position by piston rod, wherein the front frame is pivoted to the rear frame when the rolling device is in the front position, wherein the front frame is pivoted away from the rear frame when the rolling device is in the rear position.

11. The collapsible mobility scooter according to claim 10, wherein the rolling device comprises an axle connected to the piston rod and two auxiliary wheels connected to the axle.

12. The collapsible mobility scooter according to claim 10, comprising a chair and a cross-linked unit arranged between the chair and the rear frame.

13. The collapsible mobility scooter according to claim 12, wherein the cross-linked unit comprises:
    a first rod comprising a lower end pivotally connected to the piston rod and an upper end in contact with the chair; and
    a second rod comprising a lower end pivotally connected to the rear frame and an upper end pivotally connected to the chair;
    wherein the chair is lifted as the lower end of the first rod is moved to a rear position by the piston rod when the front frame is pivoted away from the rear frame, wherein the chair is lowered as the lower end of the first rod is moved to a front position by the piston rod when the front frame is pivoted to the rear frame.

* * * * *